US012049774B2

(12) United States Patent
Sperger

(10) Patent No.: US 12,049,774 B2
(45) Date of Patent: Jul. 30, 2024

(54) ASSEMBLY FOR GUIDING AT LEAST ONE MOVABLE FURNITURE DOOR

(71) Applicant: Julius Blum GmbH, Hoechst (AT)

(72) Inventor: Thomas Sperger, Hard (AT)

(73) Assignee: JULIUS BLUM GMBH, Hoechst (AT)

( * ) Notice: Subject to any disclaimer, the term of this patent is extended or adjusted under 35 U.S.C. 154(b) by 334 days.

(21) Appl. No.: 17/395,742

(22) Filed: Aug. 6, 2021

(65) Prior Publication Data

US 2021/0363803 A1 Nov. 25, 2021

Related U.S. Application Data

(63) Continuation of application No. PCT/AT2020/060011, filed on Jan. 17, 2020.

(30) Foreign Application Priority Data

Feb. 7, 2019 (AT) .............................. A 50094/2019

(51) Int. Cl.
*E05D 15/26* (2006.01)

(52) U.S. Cl.
CPC ...... *E05D 15/264* (2013.01); *E05Y 2201/684* (2013.01); *E05Y 2600/12* (2013.01); *E05Y 2600/312* (2013.01); *E05Y 2900/212* (2013.01)

(58) Field of Classification Search
CPC ....... E05D 15/264; E05D 15/26; E05D 15/58; E05D 2015/586; E05D 15/266; E05Y 2201/684; E05Y 2600/12; E05Y 2600/312; E05Y 2900/212; E05Y 2600/50; E05Y 2600/14; E05Y 2600/60; E05Y 2600/61;

(Continued)

(56) References Cited

U.S. PATENT DOCUMENTS 4,509,291 A * 4/1985 Geisthardt ............ E05D 15/063 49/501
5,078,461 A * 1/1992 Beck ..................... E06B 3/5045 312/331

(Continued)

FOREIGN PATENT DOCUMENTS

| | | |
|---|---|---|
| CN | 104653014 | 5/2015 |
| CN | 107002439 | 8/2017 |

(Continued)

OTHER PUBLICATIONS

International Search Report issued Apr. 7, 2020 in International (PCT) Application No. PCT/AT2020/060011.

*Primary Examiner* — Hiwot E Tefera
(74) *Attorney, Agent, or Firm* — Wenderoth, Lind & Ponack, L.L.P.

(57) ABSTRACT

An assembly includes a longitudinal rail oriented substantially parallel to a closing plane, in which the a movable furniture door is arranged in the closing position, and a transverse rail arranged transversely to the longitudinal rail. The transverse rail can be arranged substantially parallel to a depth direction of a side space of a stationary furniture part. A fastening device can fasten the longitudinal rail and/or transverse rail to the stationary furniture part. The fastening device has an adjustment device for adjusting the longitudinal rail and/or transverse rail to be substantially parallel to a longitudinal direction of the transverse rail relative to the stationary furniture part.

19 Claims, 8 Drawing Sheets

(58) Field of Classification Search
CPC ........... E05Y 2600/62; E05Y 2600/622; E05Y 2600/634; E06B 3/5045
See application file for complete search history.

(56) References Cited

U.S. PATENT DOCUMENTS

| | | | | |
|---|---|---|---|---|
| 5,121,976 | A | 6/1992 | Haab et al. | |
| 5,149,180 | A | 9/1992 | Haab et al. | |
| 5,240,216 | A * | 8/1993 | Lin | E05D 15/38 248/300 |
| 6,438,795 | B1 * | 8/2002 | Haab | E05F 5/003 16/86 B |
| 9,091,106 | B2 | 7/2015 | Allen et al. | |
| 9,284,761 | B2 | 3/2016 | Haab et al. | |
| 9,624,705 | B2 | 4/2017 | Haab et al. | |
| 10,400,493 | B2 | 9/2019 | Gabi | |
| 10,794,101 | B2 * | 10/2020 | Preising, Jr. | E05D 15/262 |
| 11,585,136 | B2 * | 2/2023 | Rupp | E06B 3/482 |
| 2004/0046488 | A1 * | 3/2004 | Hogan | E06B 3/5045 312/322 |
| 2013/0025232 | A1 * | 1/2013 | Wang | A47K 3/34 52/656.4 |
| 2014/0150208 | A1 | 6/2014 | Haab et al. | |
| 2014/0237715 | A1 * | 8/2014 | Wei | A47K 3/34 4/607 |
| 2014/0250633 | A1 | 9/2014 | Allen et al. | |
| 2015/0143666 | A1 | 5/2015 | Winkler | |
| 2016/0201368 | A1 | 7/2016 | Haab et al. | |
| 2017/0260789 | A1 | 9/2017 | Gabl | |
| 2018/0163400 | A1 * | 6/2018 | Mei | E04B 2/7416 |
| 2019/0284859 | A1 * | 9/2019 | Rupp | E05F 3/20 |
| 2019/0330898 | A1 * | 10/2019 | Rupp | E05D 15/58 |
| 2020/0040632 | A1 | 2/2020 | Rupp et al. | |
| 2021/0363803 | A1 * | 11/2021 | Sperger | E05D 15/264 |
| 2022/0364403 | A1 * | 11/2022 | Rupp | E05D 15/0652 |

FOREIGN PATENT DOCUMENTS

| | | |
|---|---|---|
| CN | 108386104 | 8/2018 |
| EP | 0 387 560 | 9/1990 |
| EP | 1 205 626 | 5/2002 |
| EP | 2 740 870 | 6/2014 |
| EP | 3 037 612 | 6/2016 |
| JP | 8-184250 | 7/1996 |
| JP | 2004-137789 | 5/2004 |
| JP | 2014-114690 | 6/2014 |
| WO | 2018/129568 | 7/2018 |
| WO | 2018/204951 | 11/2018 |
| WO | 2019/014693 | 1/2019 |

* cited by examiner

ASSEMBLY FOR GUIDING AT LEAST ONE MOVABLE FURNITURE DOOR

BACKGROUND OF THE INVENTION

The invention concerns an assembly for guiding at least one moveable furniture door, in particular a folding-sliding door, relative to a stationary furniture part between a closed position of outwardly covering at least one internal space in the stationary furniture part and an open position which is at least region-wise sunk in an in particular shaft-shaped side space of the stationary furniture part and in which the at least one internal space of the stationary furniture part is freely accessible to a user. The assembly includes at least one longitudinal rail which is oriented substantially parallel to a closing plane in which the at least one moveable furniture door is arranged in the closed position, and at least one transverse rail arranged transversely, in particular perpendicularly, to the longitudinal rail. The transverse rail can be arranged substantially parallel to a depth direction of the side space of the stationary furniture part, and at least one fixing device is provided for fixing the at least one longitudinal rail and/or transverse rail to the stationary furniture part.

The invention further concerns an article of furniture comprising at least one moveable furniture door, in particular a folding-sliding door, a stationary furniture part which has at least one internal space and at least one in particular shaft-shaped side space. At least one assembly is provided for guiding the at least one moveable furniture door relative to the stationary furniture part between a closed position outwardly covering at least one internal space in the stationary furniture part and an open position which is at least region-wise sunk in the at least one side space of the stationary furniture part and in which the at least one internal space of the stationary furniture part is freely accessible to a user. The at least one longitudinal rail and/or transverse rail is fixed to the stationary furniture part by way of the at least one fixing device.

Assemblies for guiding at least one moveable furniture door relative to a stationary furniture part are known from the state of the art. WO 2018/129568 A1 to the present applicant discloses an assembly for guiding a moveable furniture part, in particular at least one furniture door, relative to a stationary furniture part. A disadvantage with such an assembly is that the position of the moveable furniture door relative to a front of an adjacent article of furniture is determined only by the position of the moveable furniture door relative to the stationary furniture part.

In other words: the position of the moveable furniture door cannot be displaced relative to the stationary furniture part. Accordingly the position of the moveable furniture door cannot be adapted to a front of an adjacent article of furniture. Therefore, a non-aligned transition from the moveable furniture door to the front of an adjacent article of furniture cannot be corrected.

If such a non-aligned transition from the moveable furniture door to the front of an adjacent article of furniture occurs that does not just result in deficiencies in terms of visual appearance and the tactile aspect of that transition.

That design arrangement can also involve tilting of the moveable furniture door with the front of an adjacent article of furniture in the course of a transition from a closed position into an open position of the moveable furniture door. In addition this can involve premature wear phenomena at the moveable furniture door and at the assembly for guiding the moveable furniture part.

SUMMARY OF THE INVENTION

The object of the present invention is to overcome the disadvantages of the state of the art and to provide an assembly for guiding at least one moveable furniture door relative to a stationary furniture part, that is improved over the state of the art. A further object is then to provide an article of furniture having at least one such assembly.

In regard to the assembly, therefore the at least one fixing device has at least one adjusting device with which the at least one longitudinal rail and/or transverse rail is adjustable substantially parallel to a longitudinal direction of the at least one transverse rail relative to the stationary furniture part.

That ensures displaceability of the moveable furniture door relative to a stationary furniture part. It is thus also possible to adapt a moveable furniture door to a front of an adjacent article of furniture.

According to a preferred embodiment of the invention, the at least one longitudinal rail and the at least one transverse rail provide a transitional region for the at least one moveable furniture part, and the at least one adjusting device includes at least one actuating element arranged in the transitional region.

It has further proven to be advantageous if the at least one actuating element is oriented substantially parallel to the longitudinal direction of the at least one transverse rail.

The at least one actuating element can also have a longitudinal axis and be mounted rotatably about the longitudinal axis, and/or have at least one tool receiving means and/or be mounted rotatably at the at least transverse rail and/or have at least one male thread.

These embodiments of the invention facilitate displacement of the longitudinal or transverse rail respectively by the adjusting device.

According to a further aspect of the invention, the at least one fixing device has at least one fixing interface for fixing the at least one fixing device to the stationary furniture part.

That ensures secure fixing of the fixing device to the stationary furniture part.

Preferably, the at least one fixing device has at least one rail-shaped portion and the at least one transverse rail is displaceable relative to the at least one rail-shaped portion by the at least one adjusting device. It is therefore also possible to provide for displacement of the transverse rail relative to the fixing device.

It has proven to be particularly advantageous if the at least one longitudinal rail and the at least one transverse rail are motionally coupled and/or rigidly connected together, preferably by way of at least one positively locking relationship. That facilitates uniform displacement of the longitudinal and transverse rails.

A further embodiment of the invention includes at least one pin, by way of which the at least one longitudinal rail and the at least one transverse rail are connected together in motionally coupled relationship, and at least one corresponding opening in which the at least one pin engages.

It has been found to be particularly advantageous if there are precisely two pins, by way of which the at least one longitudinal rail and the at least one transverse rail are connected together in motionally coupled relationship. Preferably, one of the two pins is provided to transmit forces substantially parallel to the longitudinal direction of the at least one transverse rail, and the other of the two pins is provided to transmit forces substantially transversely to the longitudinal direction of the at least one transverse rail, particularly preferably in the mounted state substantially in the vertical direction. That ensures the best possible coupling or connection between the longitudinal rail and the transverse rail.

Preferably, the at least one longitudinal rail and the at least one transverse rail are displaceable jointly by way of the at least one adjusting device substantially parallel to the longitudinal direction of the at least one transverse rail relative to the stationary furniture part. That make it easier to adapt the moveable furniture door to the front of an adjacent article of furniture.

According to a further aspect of the invention, the at least one longitudinal rail and/or transverse rail is displaceable by the at least one adjusting device over a displacement distance of 10 mm, preferably 7 mm, relative to the stationary furniture part.

The assembly for each of the longitudinal and transverse rails can have a respective adjusting device, with which the respective rail is displaceable substantially parallel to the longitudinal direction of the at least one transverse rail relative to the stationary furniture part.

According to a further embodiment of the invention, at least one carrier is provided to which the at least one moveable furniture door can be mounted and which is mounted moveably by way of at least one guide device at the at least one tranverse rail and/or at least one carriage is mounted displaceably at the at least one longitudinal rail and can be coupled to the at least one moveable furniture door. That promotes stability of an assembly according to the invention.

Preferably, the stationary furniture part has at least one side surface which at least region-wise delimits the at least one side space and at which the at least one transverse rail is arranged, and/or at least one top cover surface which at least region-wise delimits upwardly the at least one internal space and at which the at least one longitudinal rail is arranged.

BRIEF DESCRIPTION OF THE DRAWINGS

Further details and advantages of the invention are described more fully hereinafter by means of the specific description with reference to the drawings in which.

DETAILED DESCRIPTION OF THE INVENTION

Figure 1A:
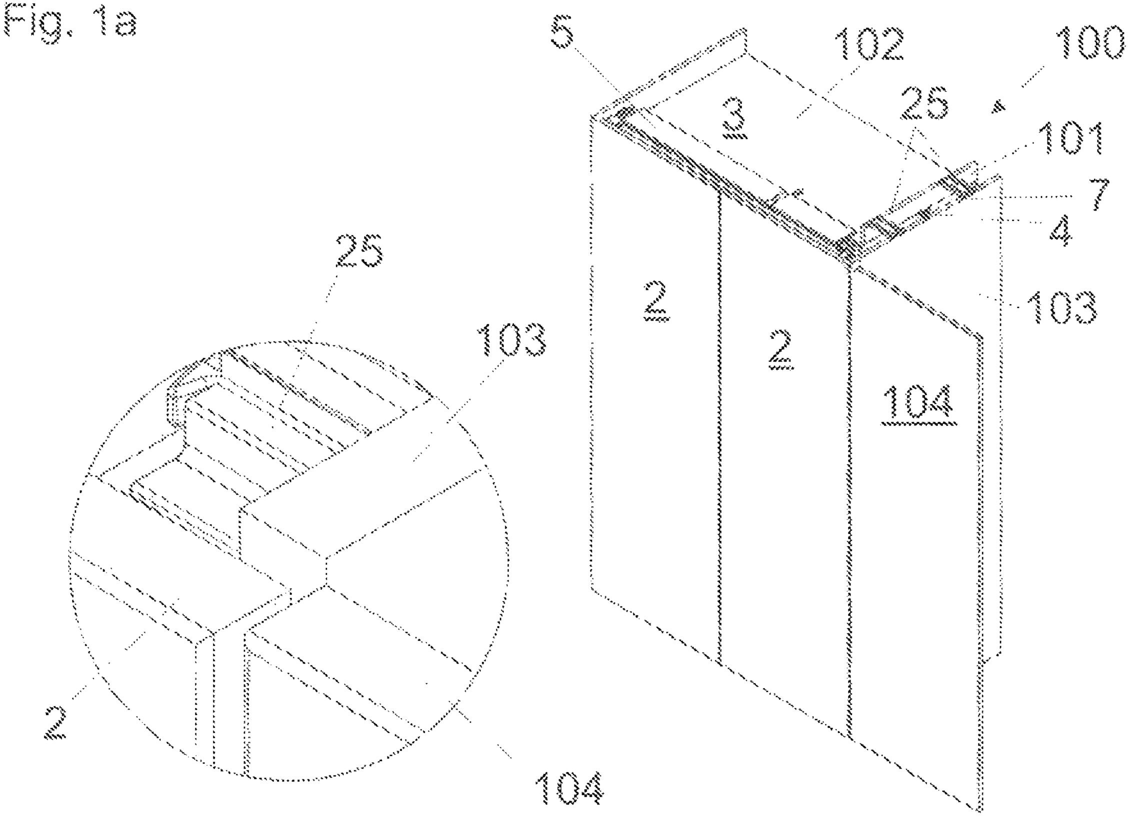
FIG. 1*a* is a perspective front view of an article of furniture according to the invention having an assembly according to the invention in a non-aligned position of the moveable furniture part relative to an adjacent furniture carcass.

FIG. 1*a* shows a perspective front-side view of an article of furniture 100 according to the invention prior to a displacement operation. That article of furniture 100 has a furniture door 2 in the form of a two-part folding-sliding door, a stationary furniture carcass 3 and a top surface 102. It is also possible to see a side space 4 which is delimited by the side surfaces 101 and 103. Other design configurations of the furniture door are also conceivable.

Those side surfaces 101, 103 are spaced from each other by two spaces 25. It is however also possible to provide a different number of spaces 25 or even no spaces 25.

A longitudinal rail 5 is arranged at the top surface 102 and a transverse rail 7 is arranged at the side surface 101. Adjoining the article of furniture 100 it is possible to see a front 104 of an adjacent article of furniture.

The detail view in FIG. 1*a* shows a non-aligned transition between the furniture door 2 and the front 104 of the article of furniture.

Figure 1B:
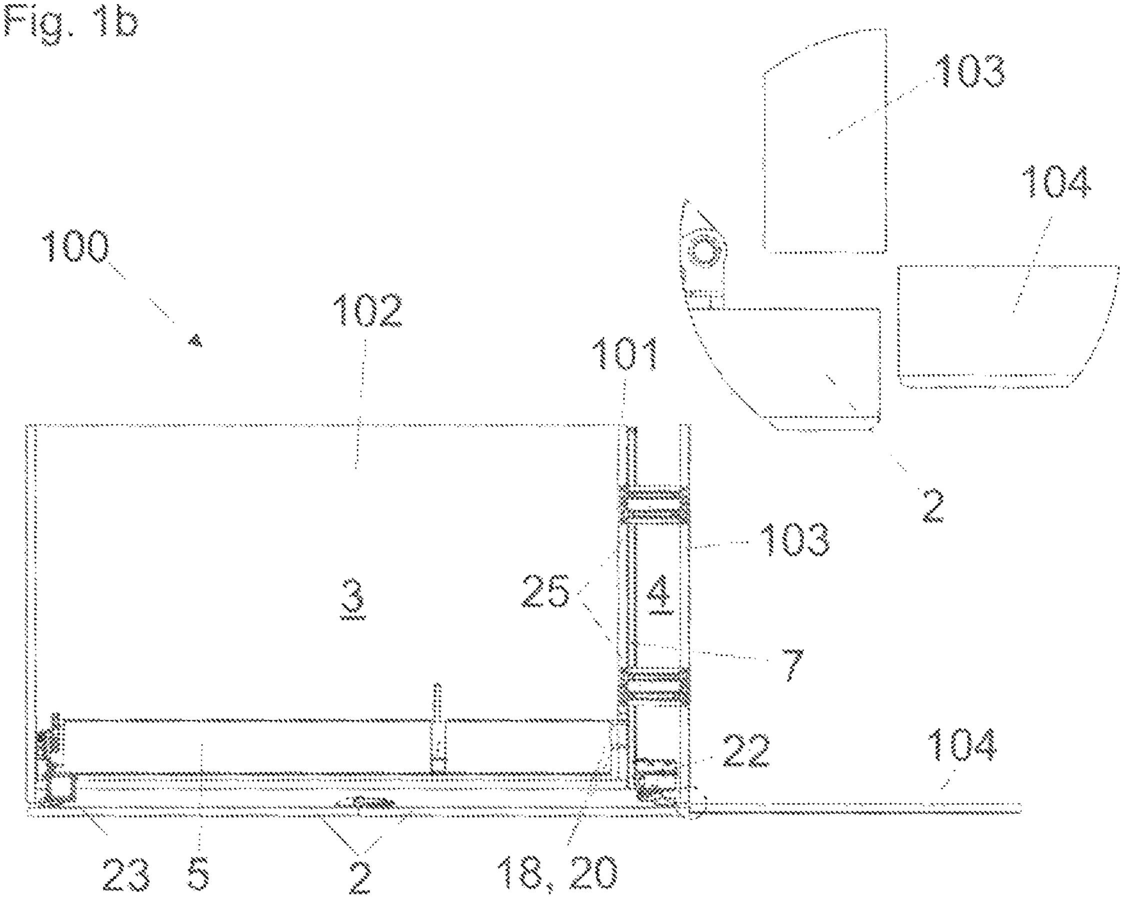
FIG. 1*b* is a plan view of an article of furniture according to the invention with an assembly according to the invention in a non-aligned position of the moveable furniture part relative to an adjacent furniture carcass.

FIG. 1*b* shows a plan view of an article of furniture 100 according to the invention prior to a displacement operation. It is again possible to see a furniture door 2 in the form of a two-part folding-sliding door, a stationary furniture carcass 3, a top surface 102, a side space delimited by the side surfaces 101 and 103 and two spacers 25.

In addition FIG. 1*b* shows a carriage 23 which can be coupled to the furniture door 2. The carriage 23 is connected moveably to a longitudinal rail 5.

A guide device 22 permits displacement of a carrier 21 (not visible) along a transverse rail 7.

In this embodiment the longitudinal rail 5 and the transverse rail 7 are rigidly connected together by means of two pins 18, 20. It is however also possible to envisage providing a non-rigid coupling or no connection between the longitudinal rail 5 and the transverse rail 7. It is also possible to provide any number of pins 18, 20.

The detail in FIG. 1*b* again illustrates the non-aligned transition between the furniture door 2 and the front 104 of the adjacent article of furniture.

Figure 2A:
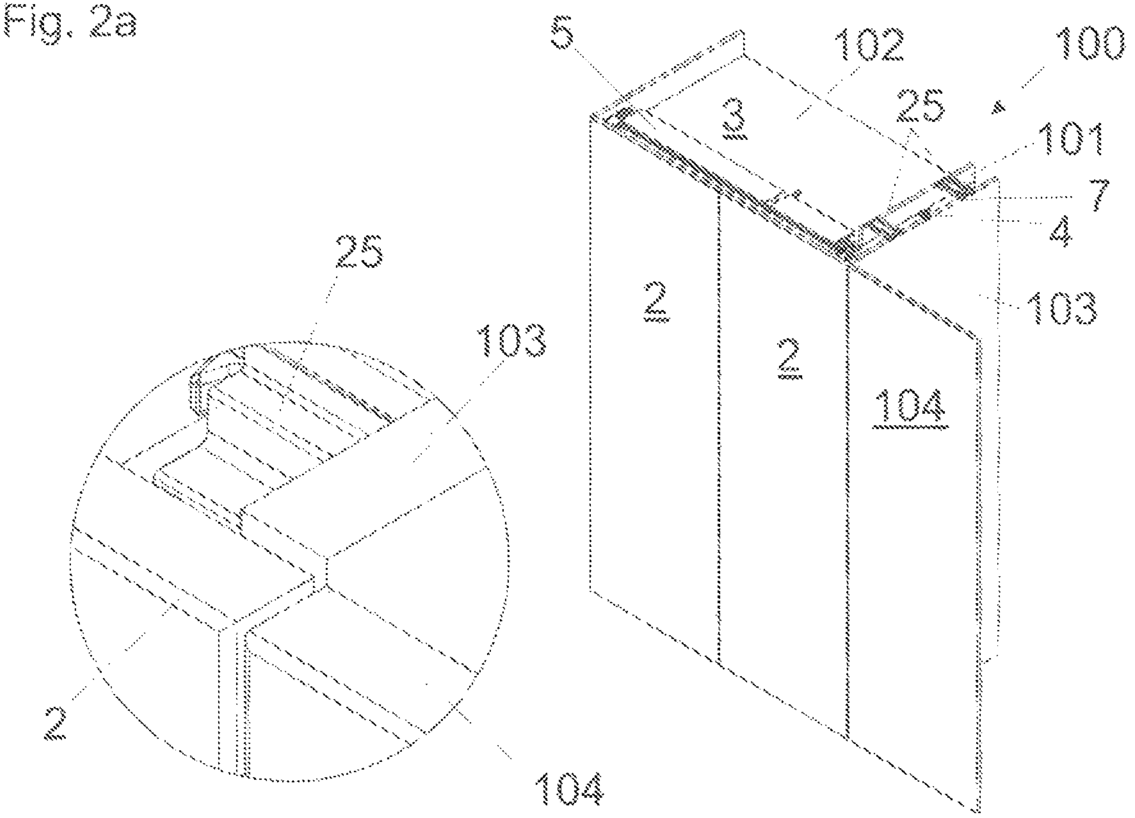
FIG. 2*a* is a perspective front view of an article of furniture with an assembly according to the invention in an aligned position of the moveable furniture part relative to an adjacent furniture carcass.

FIG. 2*a* shows a perspective front-side view of an article of furniture 100 according to the invention after a displacement operation. As the detail view shows a furniture door 2 has been moved in the direction of a side surface 103 of a side space 4 and thus in the direction of a stationary furniture part.

As a result the furniture door 2 is aligned with a front 104 of an adjacent article of furniture.

Figure 2B:
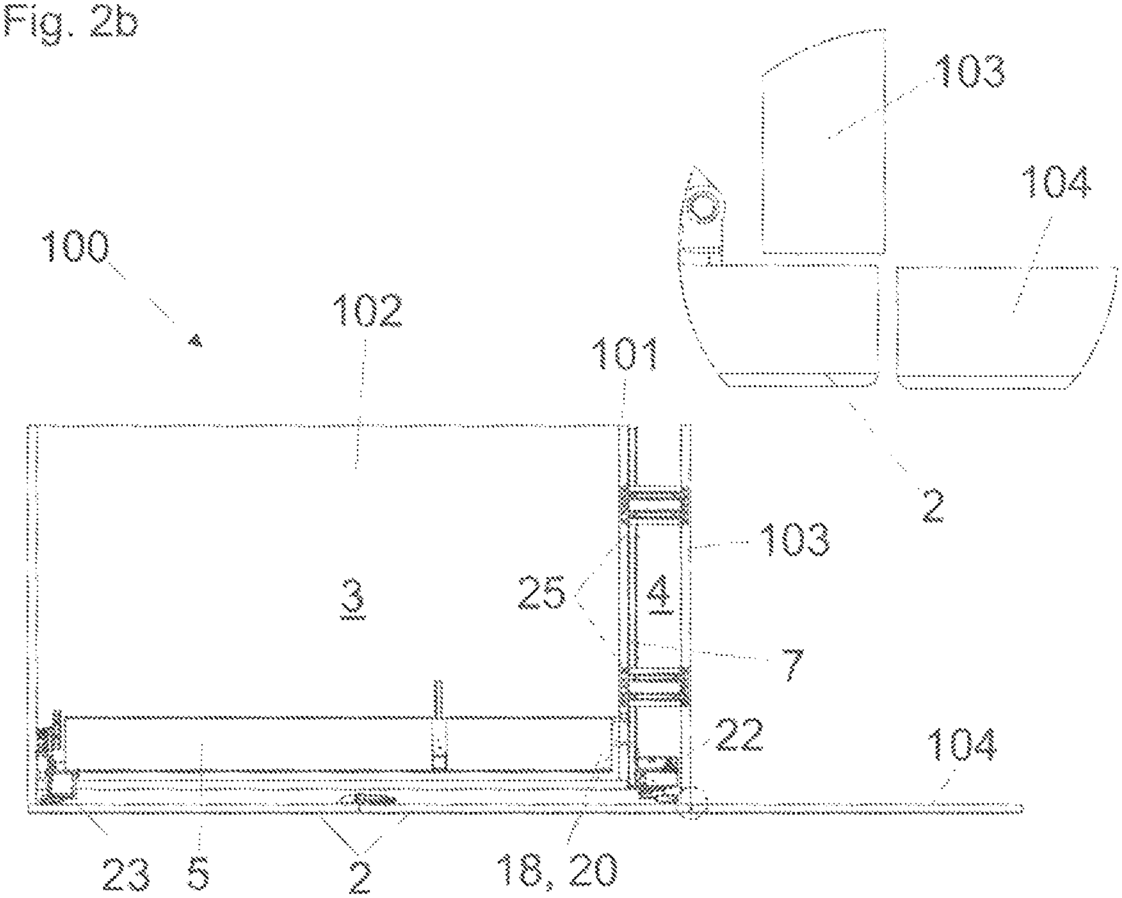
FIG. 2*b* is a plan view of an article of furniture with an assembly according to the invention in an aligned position of the moveable furniture part relative to an adjacent furniture carcass.

FIG. 2*b* shows a plan view of an article of furniture 100 according to the invention after a displacement operation. It can again be seen that a furniture door 2 and a front 104 are now aligned with each other.

Figure 3A:
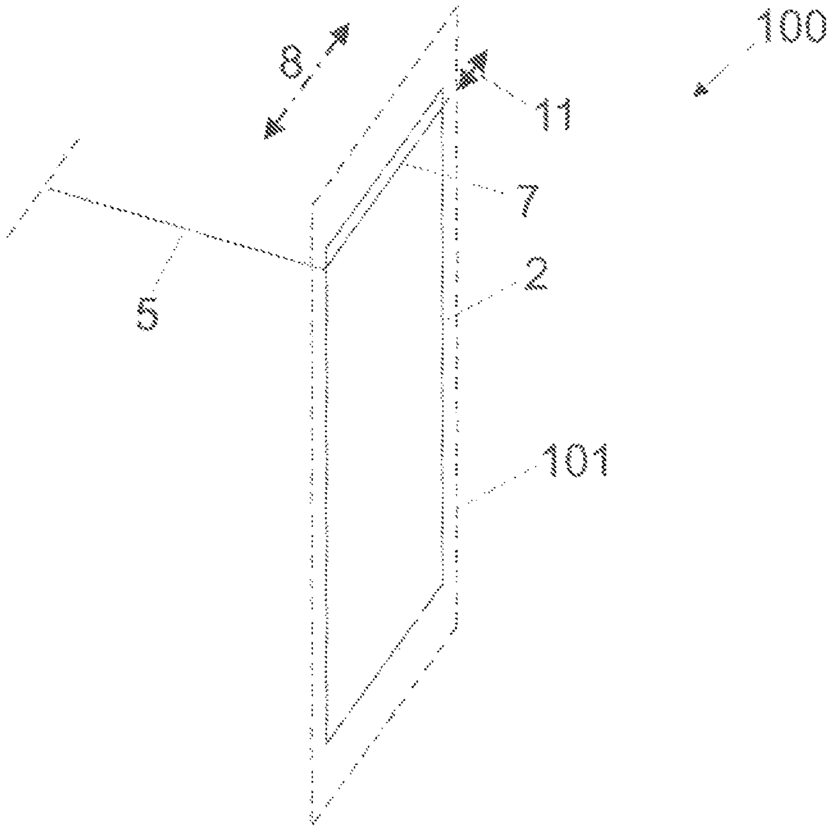
FIG. 3*a* is a diagrammatic perspective view of an assembly according to the invention.

FIG. 3*a* shows a diagrammatic perspective view of an article of furniture 100 according to the invention. It is possible to see a side surface 101 of a side space 4 and a depth direction 8 of the side space 4, that is parallel to that side surface 101.

A moveable furniture door 2 in a closed position is substantially parallel to the side surface 101 and thus to the depth direction 8 of the side space 4.

In a displacement operation the longitudinal rail 5 and the transverse rail 7 are displaced parallel to the longitudinal extent 11 of the transverse rail 7. In this respect the longitudinal extent 11 is substantially parallel to the side surface 101 and to the depth direction 8 of the side space 4.

Figure 3B:
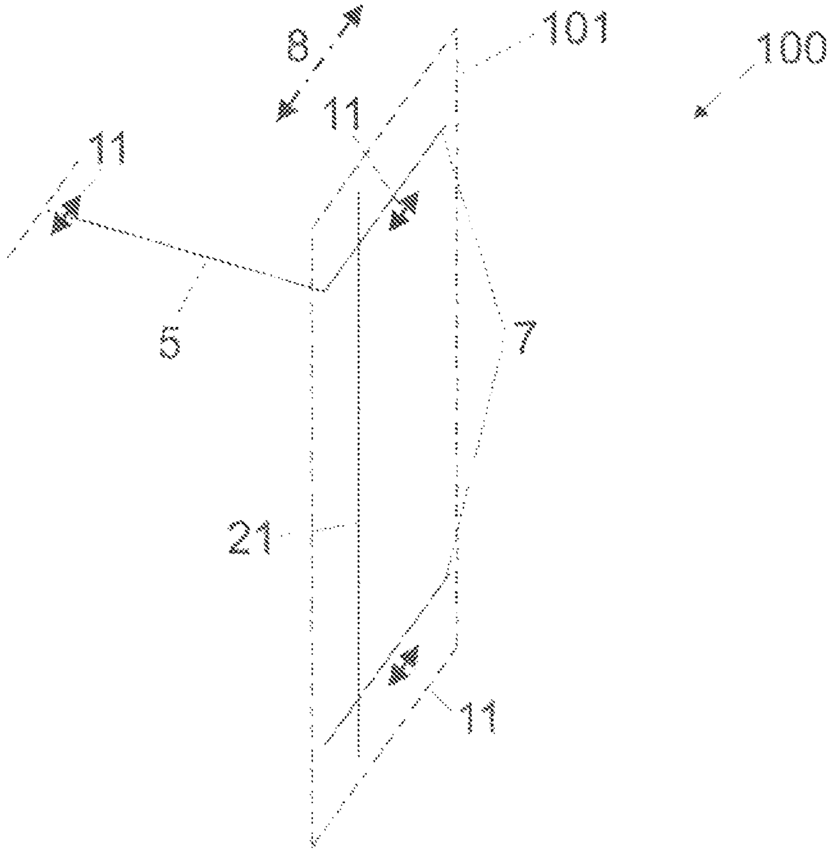
FIG. 3*b* is a further diagrammatic perspective view of an assembly according to the invention.

FIG. 3*b* shows a further diagrammatic perspective view of an article of furniture 100 according to the invention. A moveable furniture door 2 is not shown in this FIG. 3*b*.

The Figure shows a carrier 21, to which a furniture door 2 (not shown) is fitted. In this case the carrier 21 is displaceable along the transverse rails 7.

A longitudinal rail 5 and the transverse rails 7 are displaceable in a displacement operation substantially parallel to a longitudinal extent 11 of the transverse rail 7, a depth direction 8 of a side space 4 and a side surface 101.

As this embodiment shows it is possible to provide any number of transverse rails 7.

It is also possible to provide a plurality of longitudinal rails 5.

Figure 4A:
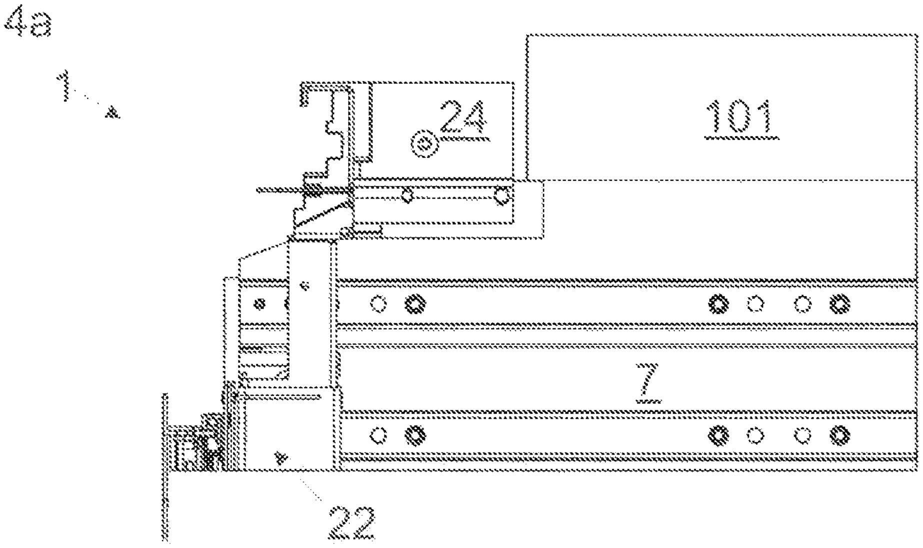
FIG. 4*a* is a side view of an assembly according to the invention in a closed position.

FIG. 4*a* shows a side view of an assembly 1 according to the invention in the closed position. A transverse rail 7 is connected by means of fixing interfaces 16 (not shown) to a side surface 101 of a side space 4.

A guide device 22 is arranged moveably on the transverse rail 7. A bridging portion 24 in this arrangement bridges over a gap between a longitudinal rail (not shown) and an upper part of the guide device 22.

Figure 4B:
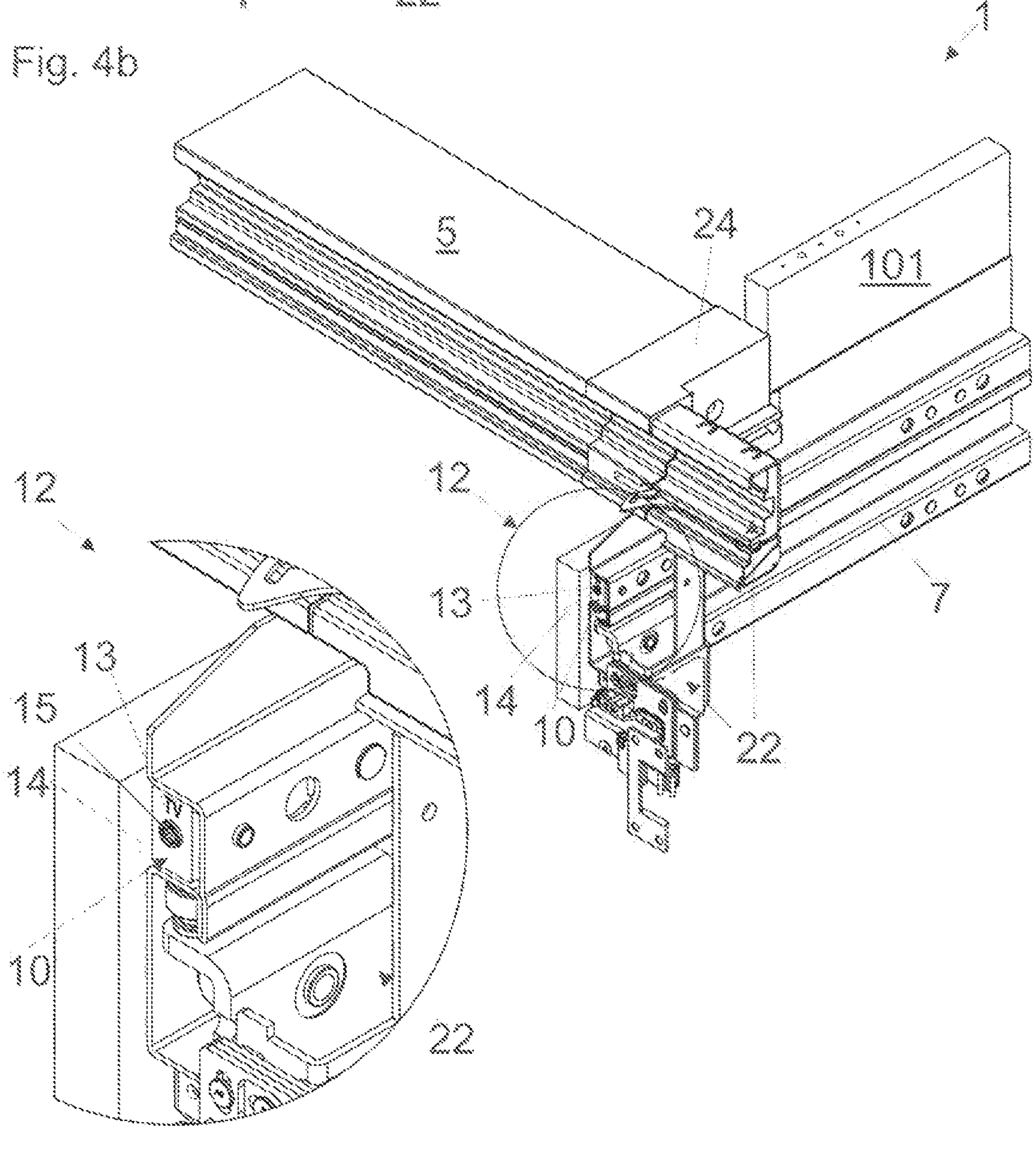
FIG. 4*b* is a perspective view of an assembly according to the invention in a closed position.

FIG. 4*b* shows a perspective view of an assembly 1 according to the invention in a closed position. It shows how the bridging portion 24 bridges over the gap between the longitudinal rail 5 and the upper part of the guide device 22.

It is also possible to see a transitional region 12 for a moveable furniture door 2. That transitional region 12 is shown again in a detail view.

It is possible to see therein an adjusting device 10 for displacement of the longitudinal rail 5 and/or the transverse rail 7 substantially parallel to a longitudinal direction 11 of the at least one transverse rail 7 relative to the stationary furniture part 3.

The adjusting device has an actuating element 13. The actuating element 13 is rotatable about a longitudinal axis 14 of the actuating element 13 and has a tool receiving means 15. The tool receiving means 15 can be designed to receive any ordinary tools and/or to receive tools which are especially developed for an assembly according to the invention.

Figure 5A:
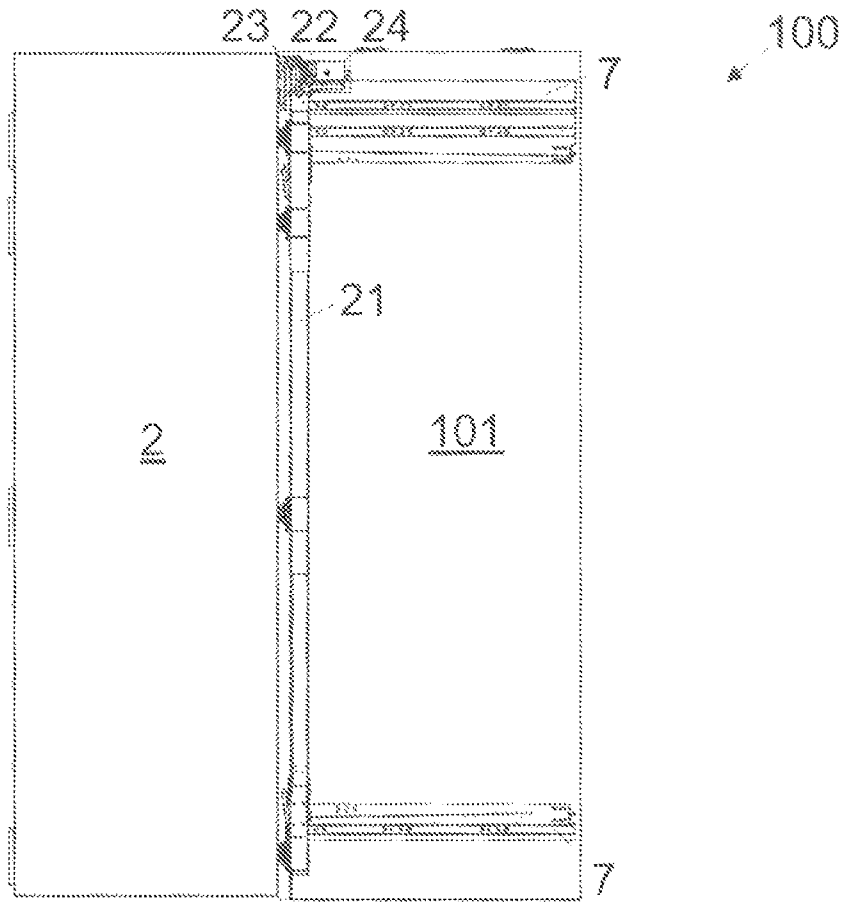
FIG. 5*a* is a side view of an article of furniture according to the invention before a displacement operation.

FIG. 5*a* shows a side view of an article of furniture 100 according to the invention prior to a displacement operation. A side surface 103 is not shown in this Figure.

In this embodiment the article of furniture 100 has two transverse rails 7. A carrier 21 is arranged moveably by means of guide devices 22 on the transverse rails 7.

A moveable furniture door 2 is again arranged on the carrier 21.

If there are two or more transverse rails 7 then an associated adjusting device 10 can also be provided for each of those transverse rails 7. The number of transverse rails 7 and adjusting devices 10 can however also be of differing magnitude.

Figure 5B:
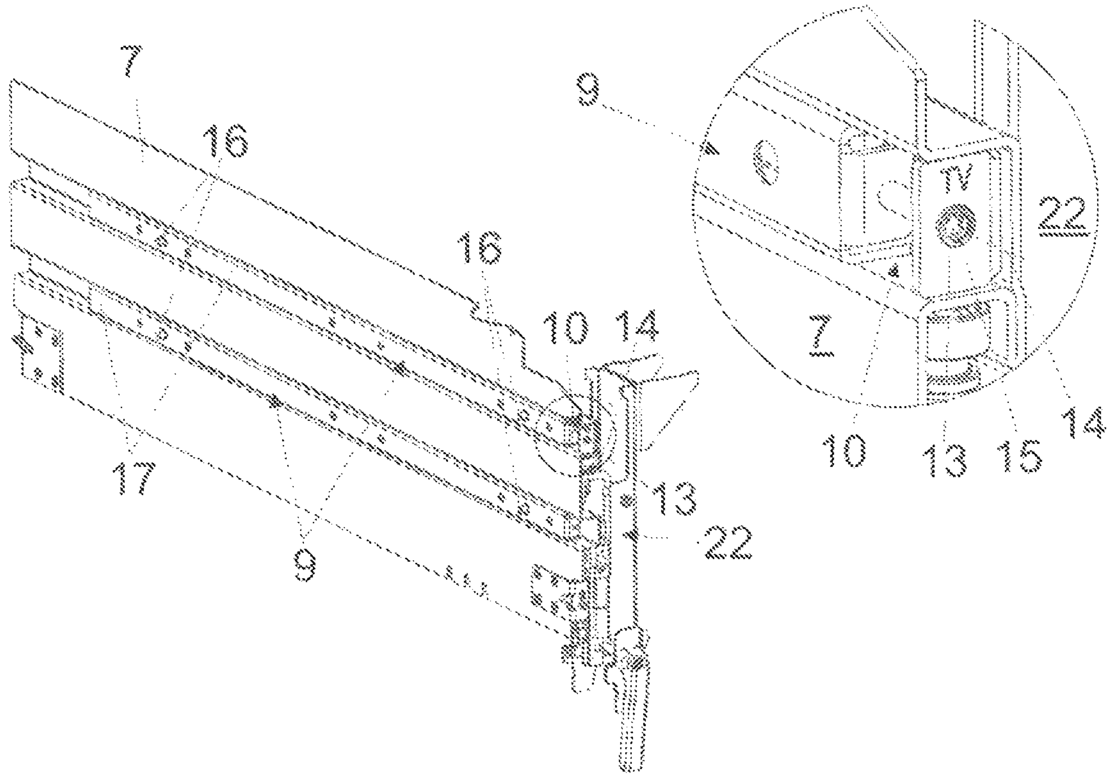
FIG. 5*b* is a perspective view of a part of an assembly according to the invention prior to a displacement operation.

FIG. 5*b* shows a perspective view of a part of an assembly 1 according to the invention prior to a displacement operation. The Figure shows a side of the transverse rail 7, that faces towards a side wall 101 (not shown).

A connection of the transverse rail 7 to the side wall 101 (not shown) is provided by means of fixing interfaces 16 of two fixing devices 9. It is however also possible to provide any number of fixing devices 9.

The fixing devices 9 can have rail-shaped portions 17 in this arrangement.

A detail view in FIG. 5*b* shows an adjusting device 10. The adjusting device 10 has an actuating element 13.

That actuating element 13 is rotatable about its longitudinal axis 14 and has a tool receiving means 15.

The actuating element 13 is preferably in the form of a screw with a male thread. It will be noted that various design configurations of the actuating device are possible, like for example in the form of pins having a plurality of latching positions.

There can also be an additional fastening device which prevents a self-implementing change in the position of the actuating element 13.

Figure 6A:
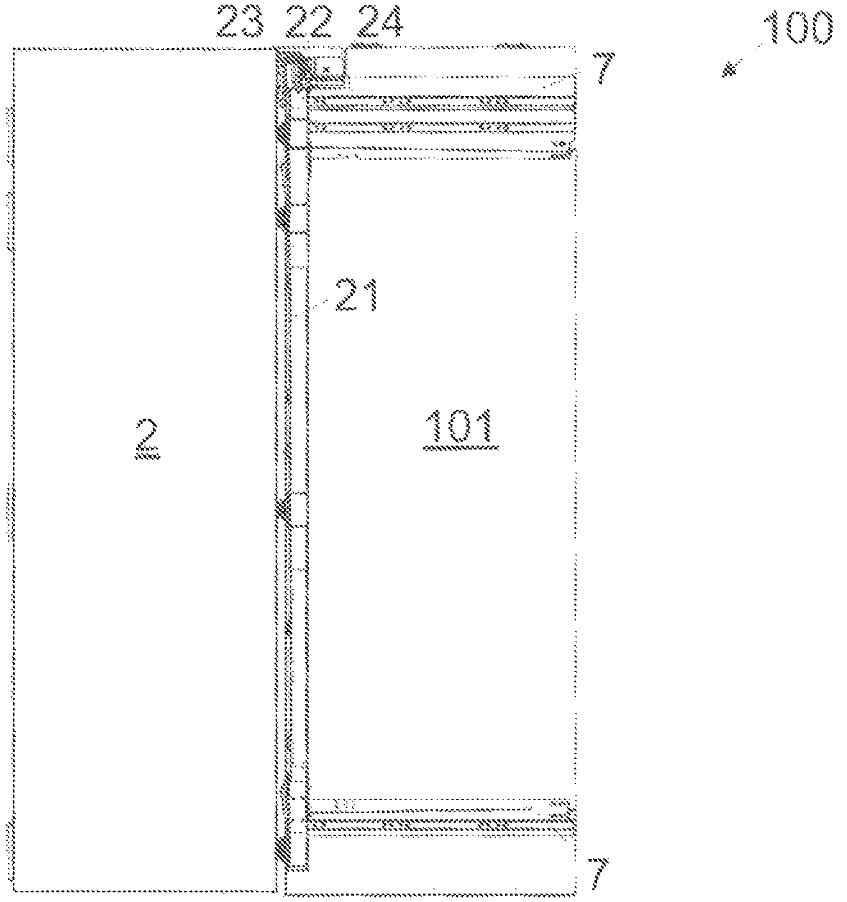
FIG. 6*a* is a side view of an article of furniture according to the invention after a displacement operation.

FIG. 6*a* shows a side view of an article of furniture 100 according to the invention after a displacement operation. The transverse rails 7 have been displaced by rotation of the actuating element 13 about its longitudinal axis 14 and are now aligned with an edge of a side surface 101, that is opposite to a carrier 21. In that way the carrier 21, the guide devices 22, the bridging portion 24 and the moveable furniture door 2 were also moved in the same direction.

Figure 6B:
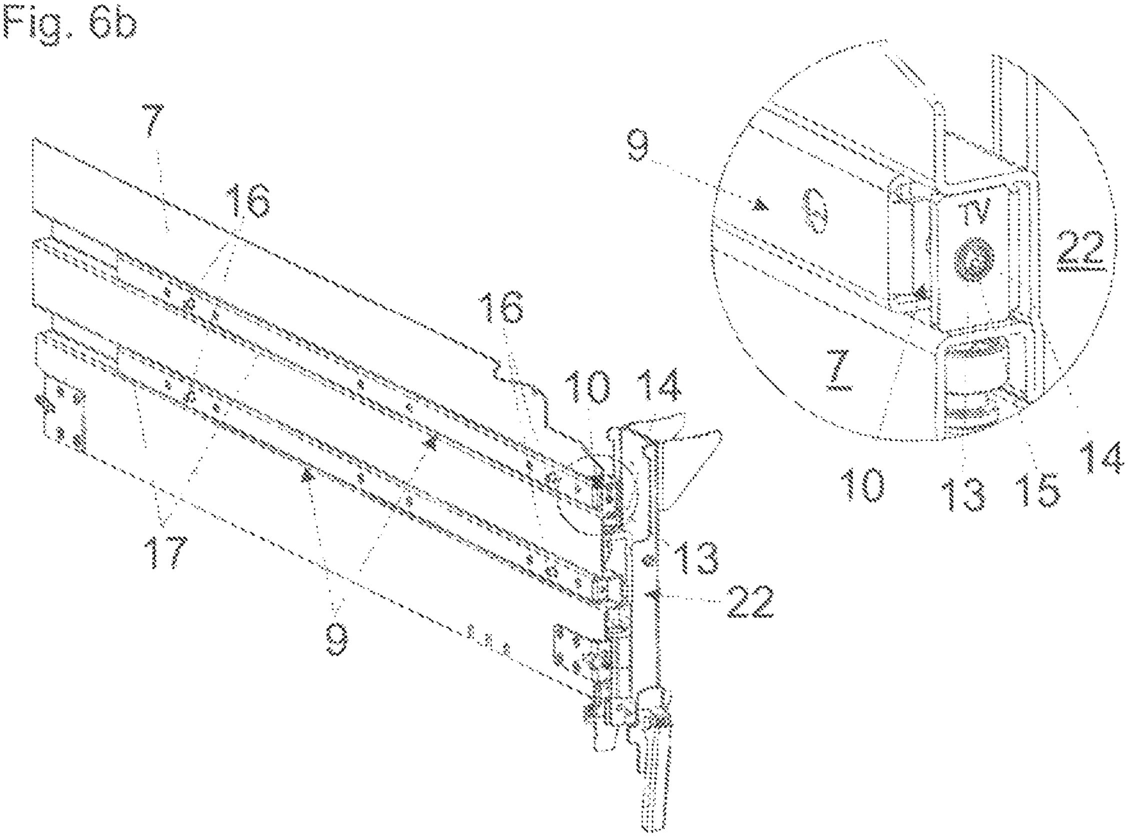
FIG. 6*b* is a perspective view of a part of an assembly according to the invention prior to a displacement operation.

FIG. 6*b* shows a perspective view of a part of an assembly 1 according to the invention prior to a displacement operation. The detail view clearly shows that a position of the transverse rail 7 with respect to a fixing device 9 has changed.

Figure 7:
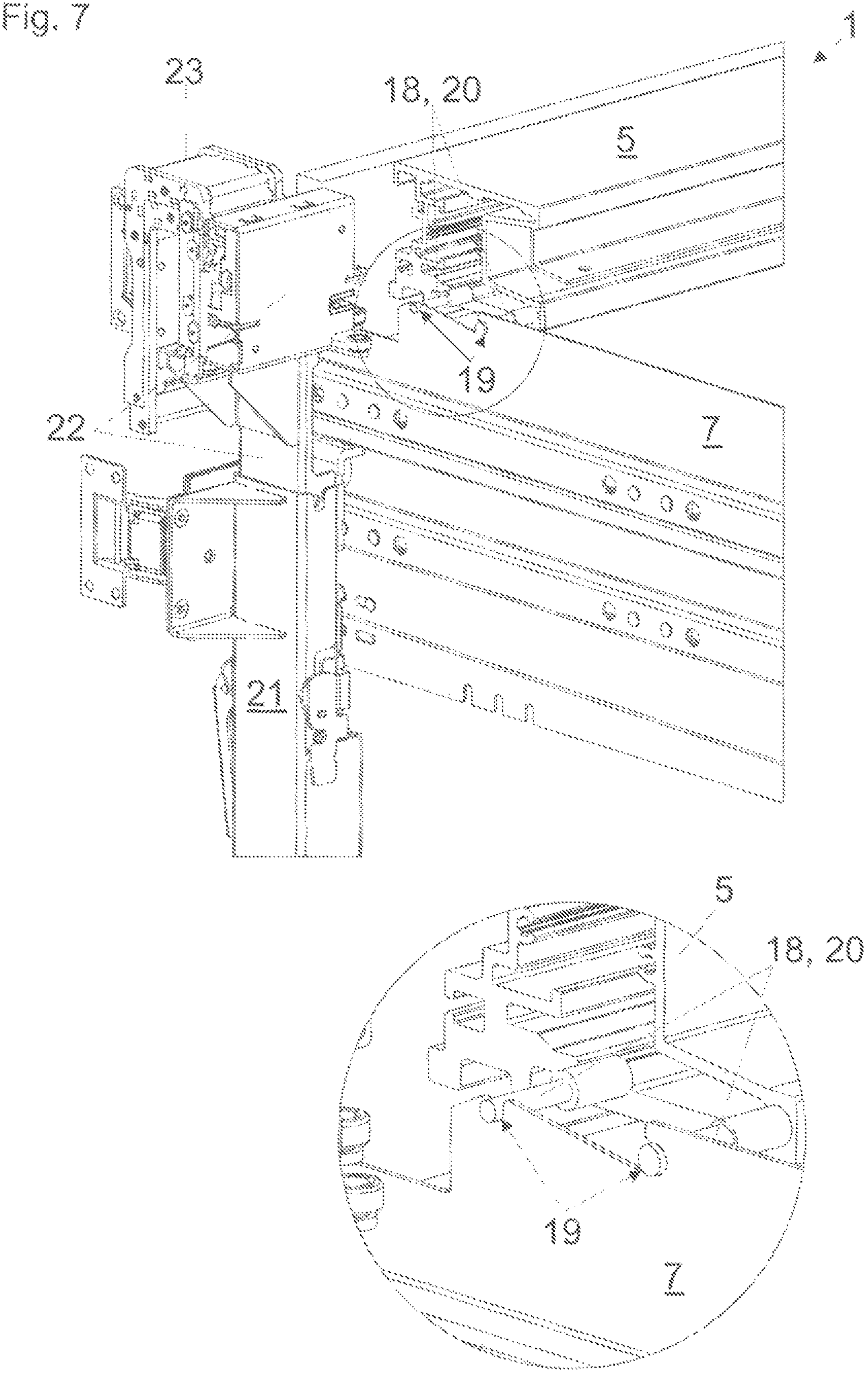
FIG. 7 is a perspective view of an assembly according to the invention in an open position.

FIG. 7 shows a perspective view of an assembly 1 according to the invention in an open position. It can be seen that a carriage 23 has moved from a longitudinal rail 5 on to an upper part of a guide device 22.

The guide device 22 is moveably coupled to a transverse rail 7 and is connected to a carrier 21. The carrier 21 and the furniture door 2 (not shown) arranged on that carrier 21 can be displaced along the transverse rail 7 by means of the guide device 22.

The longitudinal rail 5 has two pins 18, 20 engaging into two openings 19 in the transverse rail 7. The longitudinal rail 5 and the transverse rail 7 are thereby rigidly connected together. Upon displacement of the transverse rail 7 the longitudinal rail 5 is also moved to the same degree.

A first pin 18, 20 in that arrangement transmits forces in the direction of a longitudinal extent (not shown) of the transverse rail 7. The other second pin 18, 20 is responsible for avoiding tilting of the longitudinal rail 5 in the vertical direction.

The detail in FIG. 7 again shows the connection between the longitudinal rail 5 and the transverse rail 7. It will be seen that one of the two openings 19 receives a first pin 18, 20 in such a way that it can carry forces in the direction of a longitudinal extent (not shown) of the transverse rail 7. A second opening 19 embraces a second pin 18, 20 in such a way that that second pin 18, 20 can avoid tilting of the longitudinal rail 5 in the vertical direction.

Figure 8A:
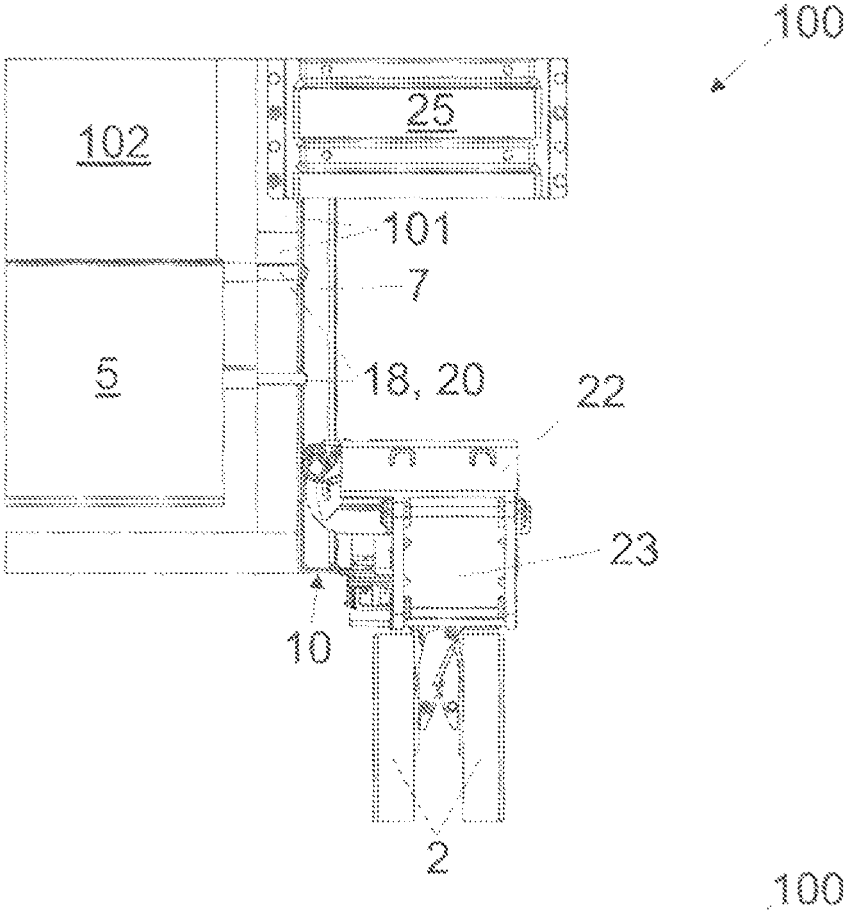
FIG. 8*a* is a plan view of a part of an article of furniture according to the invention in an open position prior to a displacement operation.

FIG. 8*a* shows a plan view of a part of an article of furniture 100 according to the invention in an open position prior to a displacement operation. It will be seen that a carriage 23 has moved on to an upper part of a guide device 22.

A moveable furniture door 2 is in an open position.

It will be seen that a front side of an adjusting device 10 is aligned with a front edge of a transverse rail 7.

Figure 8B:
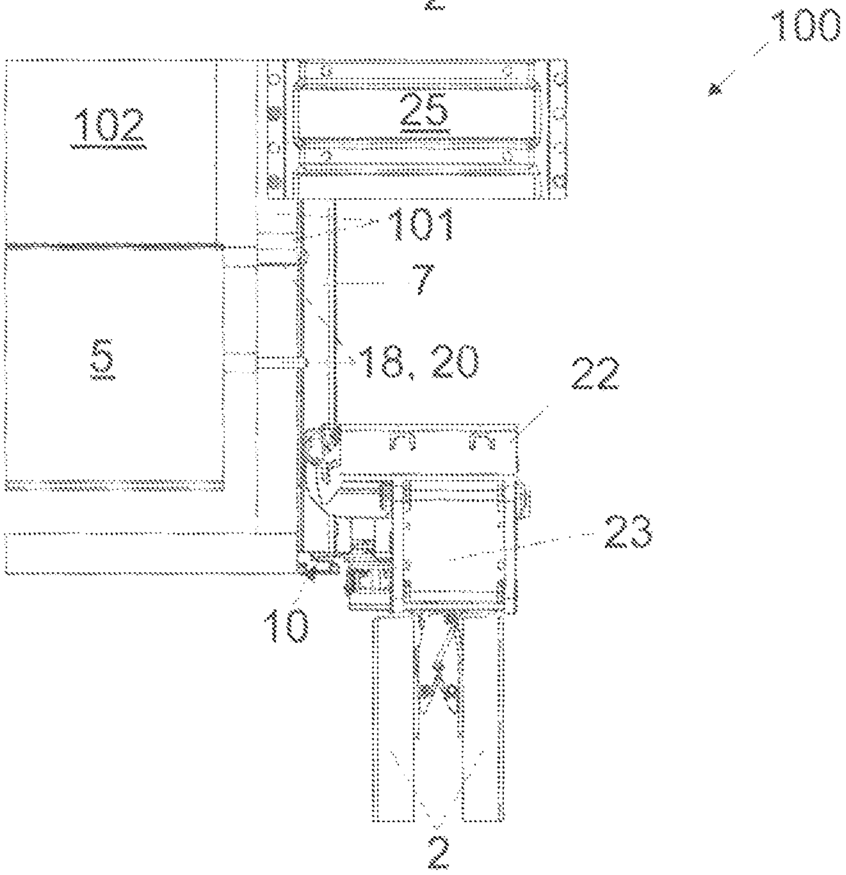
FIG. 8*b* is a plan view of a part of an article of furniture according to the invention in an open position after a displacement operation.

FIG. 8*b* shows a plan view of a part of an article of furniture 100 according to the invention in an open position after a displacement operation. The transverse rail 7 was moved in the direction of a spacer 25 by actuation of the adjusting device 10.

The longitudinal rail 5 was also moved in the direction of the spacer 25 by the connection of the transverse rail 7 to a longitudinal rail 5 by way of pins 18, 20.

As the carriage 23, the carrier 21 and therewith the moveable furniture door 2 are mounted moveably to the transverse rail 7 by way of the guide device 22, the carriage 23, the carrier 21, the moveable furniture door 2 and the guide device 22 were also moved in the direction of the spacer 25.

The invention claimed is:

1. An assembly for guiding at least one moveable furniture door relative to a stationary furniture part between a closed position in which the at least one moveable furniture door outwardly covers at least one internal space in the stationary furniture part, and an open position in which the at least one moveable furniture door is at least partially arranged within a side space of the stationary furniture part and in which the at least one internal space of the stationary furniture part is freely accessible to a user, wherein the assembly includes:

a longitudinal rail which is oriented substantially parallel to a closing plane in which the at least one moveable furniture door is arranged in the closed position;

a transverse rail arranged transversely to the longitudinal rail, wherein the transverse rail can be arranged substantially parallel to a depth direction of the side space of the stationary furniture part; and at least one fixing device for fixing the longitudinal rail or the transverse rail to the stationary furniture part, wherein the at least one fixing device has at least one adjusting device with which the longitudinal rail or the transverse rail is adjustable relative to the stationary furniture part in a direction substantially parallel to a longitudinal direction of the transverse rail, wherein the longitudinal rail and the transverse rail provide a transitional region for the at least one moveable furniture door, and wherein the at least one adjusting device includes at least one actuating element arranged in the transitional region, wherein the at least one actuating element is oriented substantially parallel to the longitudinal direction of the transverse rail, and wherein the at least one actuating element has a longitudinal axis and is mounted rotatably about the longitudinal axis, or is mounted rotatably at the transverse rail, or has at least one male thread.

2. The assembly as set forth in claim 1, wherein the at least one actuating element has at least one tool receiving means.

3. The assembly as set forth in claim 1, wherein the at least one fixing device has at least one fixing interface for fixing the at least one fixing device to the stationary furniture part.

4. The assembly as set forth in claim 1, wherein the at least one fixing device has at least one rail-shaped portion and the transverse rail is displaceable relative to the at least one rail-shaped portion by means of the at least one adjusting device.

5. The assembly as set forth in claim 1, wherein the longitudinal rail and the transverse rail are motionally coupled or rigidly connected together by way of at least one positively locking relationship.

6. The assembly as set forth in claim 1, further comprising at least one pin by way of which the longitudinal rail and the transverse rail are connected together in a motionally coupled relationship.

7. The assembly as set forth in claim 6, further comprising at least one corresponding opening in which the at least one pin engages.

8. The assembly as set forth in claim 6, wherein the at least one pin comprises precisely two pins, by way of which the longitudinal rail and the transverse rail are connected together in the motionally coupled relationship.

9. The assembly as set forth in claim 8, wherein one of the two pins is provided to transmit forces substantially parallel to the longitudinal direction of the transverse rail and the other of the two pins is provided to transmit forces substantially transversely to the longitudinal direction of the transverse rail.

10. The assembly as set forth in claim 9, wherein in a mounted state of the assembly, the forces transmitted by the other of the two pins are substantially in a vertical direction.

11. The assembly as set forth in claim 1, wherein the longitudinal rail and the transverse rail are displaceable jointly, by way of the at least one adjusting device, relative to the stationary furniture part in the direction substantially parallel to the longitudinal direction of the transverse rail.

12. The assembly as set forth in claim 1, wherein the longitudinal rail or the transverse rail is displaceable by means of the at least one adjusting device over a displacement distance of 10 mm relative to the stationary furniture part.

13. The assembly as set forth in claim 12, wherein the longitudinal rail or the transverse rail is displaceable by means of the at least one adjusting device over a displacement distance of 7 mm relative to the stationary furniture part.

14. The assembly as set forth in claim 1, wherein the at least one adjusting device comprises a respective adjusting device for each of the longitudinal rail and the transverse rail, with which the longitudinal rail and the transverse rail are respectively displaceable relative to the stationary furniture part in the direction substantially parallel to the longitudinal direction of the transverse rail.

15. The assembly as set forth in claim 1, further comprising:

at least one carrier to which the at least one moveable furniture door can be mounted and which is mounted moveably by way of at least one guide device at the tranverse rail; or at least one carriage which is mounted displaceably at the longitudinal rail and which can be coupled to the at least one moveable furniture door.

16. The assembly as set forth in claim 1, wherein the at least one moveable furniture door includes a folding-sliding door, wherein the side space of the stationary furniture part is an elongated side space, and wherein the transverse rail is arranged perpendicularly to the longitudinal rail.

17. An article of furniture comprising:

at least one moveable furniture door;

a stationary furniture part which has at least one internal space and at least one side space; and the assembly as set forth in claim 1 for guiding the at least one moveable furniture door relative to the stationary furniture part between a closed position in which the at least one moveable furniture door outwardly covers the at least one internal space in the stationary furniture part, and an open position in which the at least one moveable furniture door is at least partially arranged in the at least one side space of the stationary furniture part and in which the at least one internal space of the stationary furniture part is freely accessible to a user, and wherein the longitudinal rail or the transverse rail is fixed to the stationary furniture part by way of the at least one fixing device.

18. The article of furniture as set forth in claim 17, wherein the stationary furniture part has at least one side surface which at least partially delimits the at least one side space and at which the transverse rail is arranged, or has at least one top cover surface which at least partially delimits upwardly the at least one internal space and in which the longitudinal rail is arranged.

19. The article of furniture as set forth in claim 17, wherein the at least one moveable furniture door includes a folding-sliding door, and wherein the at least one side space includes an elongated side space.

* * * * *